March 24, 1970 H. ODEN ET AL 3,502,818

CALL FORWARDING SYSTEM WITH TIMED CANCELLATION

Filed Feb. 9, 1966 2 Sheets-Sheet 1

CALL FORWARDING SYSTEM WITH TIMED CANCELLATION

United States Patent Office 3,502,818
Patented Mar. 24, 1970

3,502,818

CALL FORWARDING SYSTEM WITH TIMED CANCELLATION

Hoeckley Oden, Korntal, and Herbert Siegel, Munchingen, Germany, assignors to International Standard Electric Corporation, New York, N.Y., a corporation of Delaware Filed Feb. 9, 1966, Ser. No. 526,303
Claims priority, application Germany, Feb. 13, 1965, 1,240,946
Int. Cl. H04m 3/54
U.S. Cl. 179—18 4 Claims

ABSTRACT OF THE DISCLOSURE

A system is provided which enables a party to reroute calls from his telephone to another telephone through an automatic dial system. The system also includes time comparison apparatus enabling the party to establish a time limit after which calls will be routed back through normal channels to this own instrument.

Figure 1:
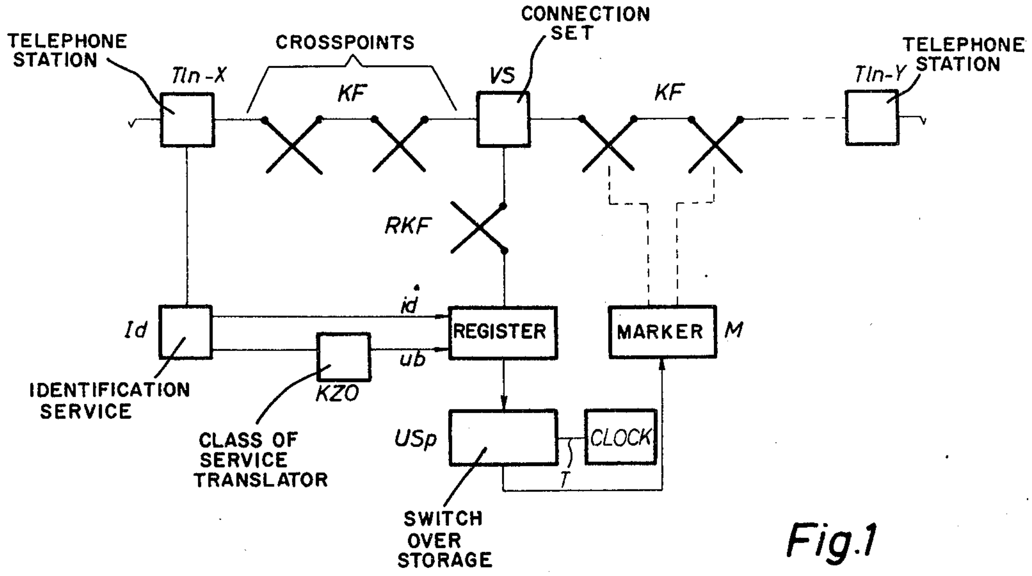

The invention relates to telephone systems and more particularly to means for switching over from one's own station to any other station in the telephone systems.

Known systems provide for the switch-over of calls from one substation to another station. Thus, a subscriber can receive his telephone calls if he is at any other substation. More particularly, before leaving his office or home, an authorized subscriber may inform either an operator or the exchange system that calls for him shall be rerouted. Thereupon a switch-over command is inserted into a switch-over storage device. The stored information includes a predetermined number for controlling the switching progress so that the call is extended to a new location. A disadvantage of this known visitor's switching is that the subscriber who caused the switch-over must cancel the switch-over when he returns so that his calls are correctly extended to his substation. Frequently, the subscriber forgets to cancel his request so that he cannot receive incoming calls.

An object of the invention is to provide a visitor's switch switch-over system that is automatically canceled at a given time.

According to the invention telephone subscribers may initiate a timely and limited switch-over. To do this the subscriber operates the dial to provide coded signals indicating: (a) a control command to perform the transfer function; (b) a call number; and (c) a time indication. A switch over storage device is provided that stores the control command and the call number which identifies the subscriber station to which the call is to be switched over. In addition the time indication is stored in the switch-over storage for controlling the cancellation of the switch-over order. The stored time indications are constantly compared with the actual time and, upon coincidence, the switch-over command is cancelled automatically. Thus, the subscriber determines the time which the switch-over shall be cancelled. After the stored time has elapsed, the switch-over order is automatically cancelled and all incoming calls are again extended directly to the called substation.

The subscriber must give the information necessary for switch-over to the exchange system. This information is then stored in a switch-over storage device for controlling the switching over. According to the invention, the translation of the switch-over information to a defined substation is effected only after the call number of the subscriber who is initiating the switch-over demand has been automatically investigated via a subscriber identification device. Then, the call number of the subscriber causing the switch-over is stored in the switch-over storage together with the called number of the substation to which the switch-over shall be made and the desired time of cancellation.

According to the invention, the switch-over is constantly supervised. After all information necessary for a switch-over has been stored, an acknowledging signal or announcement is given to the initiating subscriber so that he will know that the "switch-over" command has been properly stored. If the subscriber thereafter places a call, a special dial tone is provided, during the switch-over condition, to indicate to the subscriber who is dialing that his substation is now in the switch-over condition.

Despite a previous storage of a signal indicating a predetermined duration for the switch-over condition, the switch-over command signal may be cancelled by the subscriber. To this end a particular feature provides that the switch-over condition is cancelled prematurely if the subscriber who initiated the switch-over dials a cancellation order and his own call number. The premature cancellation of the switch-over is thereupon confirmed by a separate signal or an announcement.

The switch-over of the subscriber connection is not necessarily limited to connections of a telephone exchange system. The information given as a switch-over address can also be the address of a connection in a paging system.

Particularly simple is the switch-over incoming calls. If the marking lines which start at the register are led via the switch-over storage device, they may be interrupted there and replaced by new markings. Thus, the marker may always operate in the same manner.

Figure 2:
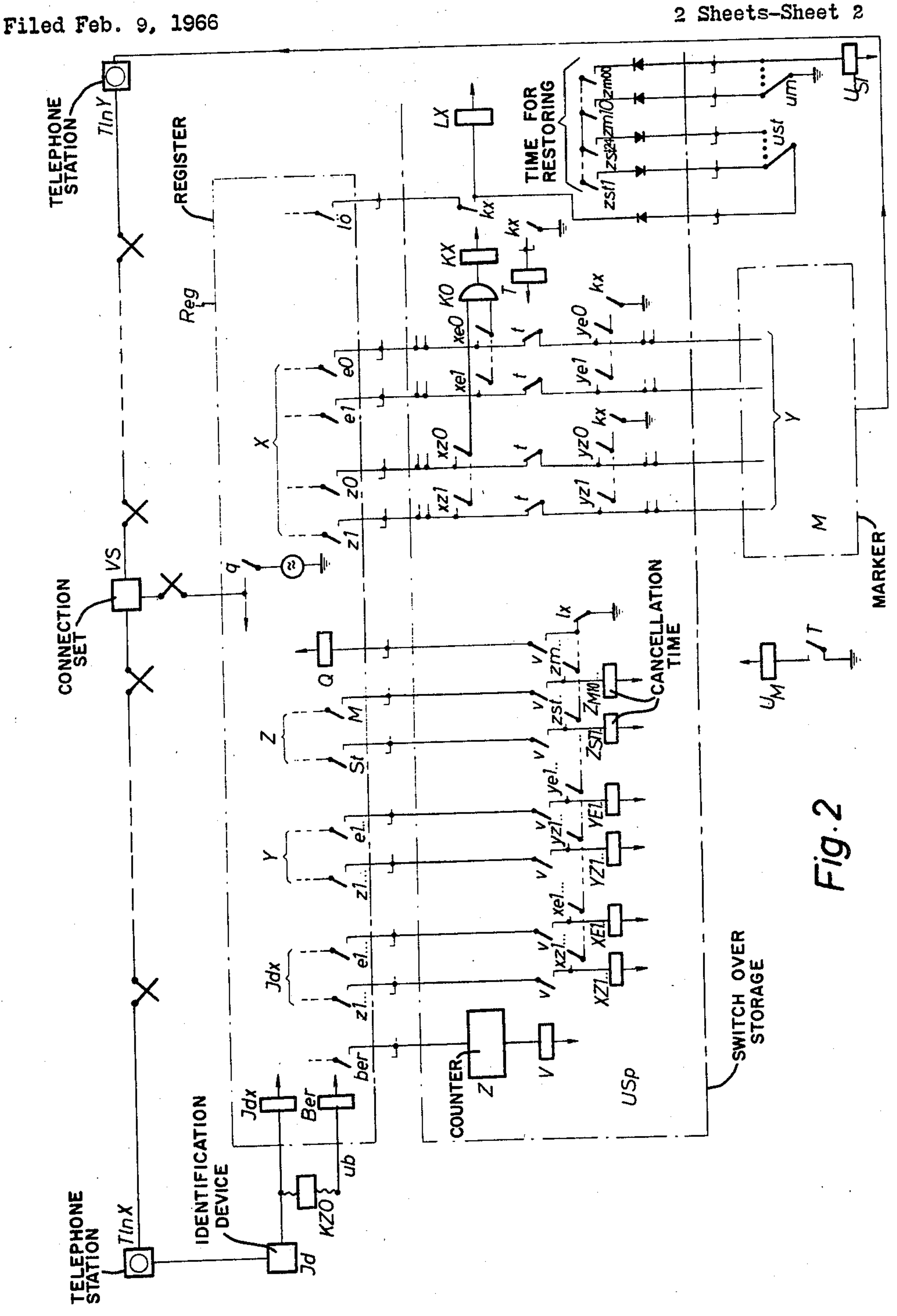

The above mentioned and other features of this invention and the manner of obtaining them will become more apparent and the invention itself will be best understood by reference to the following description of an embodiment of the invention taken in conjunction with the accompanying drawings, in which:

FIG. 1 shows a functional block diagram which explains the principles which are used according to the invention; and FIG. 2 shows an example for an exchange system with registers and markers.

FIG. 1 shows a functional diagram of the telephone exchange system in which the invention may be used. The subscriber at station T*ln*–X is authorized to make a timely and limited switch-over of his connection to any other arbitrary subscriber of the system. Therefore, after the handset has been lifted, the station T*ln*–X is connected with a connection set VS, via the crosspoint arrangement KF. A register R*eg* is connected to receive the dial pulses via the register switching grid RKF. When a normal connection is established the register R*eg* receives the call number of the desired subscriber and directly controls the marker M via the switch-over storage US*p*. The connection to the desired subscriber is then set in any way known. While such a connection is being established the identification device I*d*, the class of service translator KZO, and the switch-over storage US*p*, remain out of function. The marker lines starting at the register R*eg* lead to the marker M via the switch-over storage US*p*.

If the subscriber T*ln*–X wants to switch his connections to another subscriber T*ln*–Y, he lifts his handset and dials the necessary control command signals, having for example the form of a defined characteristic digital combination. The register R*eg* recognizes the command signals as an order to switch-over. The subscriber's authorization to switch-over his substation is investigated via the identification device I*d* and the class of service translator KZO.

Subscriber identification and determinaion of authorization by interrogation of the device KZO can also be made at each seizing of a register. The digits dialed by the subscriber T*ln*–X mark the connection T*ln*–Y to which the calling station shall be switched over. Thereupon the subscriber T*ln*–X dials a multidigit number indicating the time when the switch-over order is to be canceled. The register R*eg* now requests the switch-over storage US*p*. At first the register checks to determine whether the subscriber T*ln*–X has already stored a switch-over order. This is investigated by coincidence of the subscriber addresses stored in the register R*eg* and in the switch-over storage US*p*. If a switch-over order is already stored for the subscriber T*ln*–X, the seized storage line is cancelled and the new switch-over order is stored as it arrives from the register R*eg*. If no switch-over order for the subscriber T*ln*–X is found in the switch-over storage, the switch-over order is stored in an available storage line of the storage US*p*.

When the order has been inscribed in the switch-over storage US*p*, the subscriber T*ln*–X receives now in a way known to the art, an indication signal or an announcement which confirms that the desired switch-over has been carried out.

If the subscriber T*ln*–X is called, his address is stored in the register R*eg*. Through direct interrogation of the switch-over storage device US*p* or via the preceding interrogation of the class of service translator KZO, a determination is made as to whether the subscriber T*ln*–X is authorized to make a switch-over and whether such a switch-over is already given. Through the subscriber address stored in the register R*eg*, the associated storage line is selected. Then, the line is read out to discover the connection over which a call must be re-routed. The storage line contains as a switch-over address, the address of the subscriber T*ln*–Y.

The marking lines arriving from the register R*eg* are disconnected in the storage US*p*. Then, the information which identifies the subscriber T*ln*–Y is transmitted to the marker M. The marking is made by the storage means and the switch-over storage US*p* as explained with the aid of FIG. 2. The marker M thus connects the lines, determined from the subscriber T*ln*–X, to the subscriber T*ln*–Y.

A time comparison device "Clock" is associated with the switch-over storage US*p* to send a clock pulse every ten minutes. The actual time indicated by such a pulse is compared constantly with the coded time data which is entered in the switch-over storage US*p*. When the stored time coincides with the actual time, the respective switch-over order is cancelled automatically.

After the subscriber T*ln*–X is switched over to receive calls at the station T*ln*–Y, he receives a separate proceed to dial tone when he makes outgoing calls. The particular proceed to dial tone is forwarded after reception of the authorization criterion in the register R*eg* and after interrogation of the switch-over storage US*p* indicates that a switch-over order is given for the subscriber T*ln*–X.

FIG. 2 shows an example of a telephone exchange using the method according to the invention. The register R*eg* includes storage means which holds the subscriber address of the subscriber T*ln*–X. This information is obtained via the identification device I*d*. The switching means I*dx* indicates that this information is offered to the switch-over storage device US*p* via the information leads *zl* . . . and *el* . . . . The letter Y indicates the storage means which receives the call number of the subscriber connection T*ln*–Y to which the calls, originally designed for T*ln*–X, will be re-routed. The letter Z indicates the storing means used to hold the time of cancellation indication. The register R*eg* is informed via the class of service translator KZO that the subscriber T*ln*–X is authorized to switch his connection to any other arbitrary connection with a certain time limit. The authorization signal *ub* is emitted by the class of service translator KZO and then registered in the register R*eg* by the switching means B*er*. Then the signal *ub* is advanced to the storage US*p*. A counter Z takes up this authorization signal and evaluates it in conjunction with a corresponding control command as a request for switch-over. The switching means V allocates an available storage line to the switch-over. The contacts *v* connect the storage switching means XZ1 . . . , XE1 . . . , YZ1 . . . , YE1 . . . , ZS*t*1 . . . , SM10 . . . to the information lines J*dx*–*z*1 . . . , –*e*1 . . . ; J*dy*–*z*1 . . . , –*e*1 . . .; arriving from the register R*eg*; Z–S*t*–M, and take over the order of the subscriber T*ln*–X for storing the switching over command signals now being stored in the register R*eg*. The storage means XZ1 . . . , XE1 . . . can always be associated with one digit of the subscriber address. Ten storage relays are made available for each digit of the information. But also a coded transmission of the information may be selected.

In the register R*eg*, the switching means Q gives an indication tone that the switch-over order has been stored in the switch-over storage US*p*. The switch-over is thereby completed. The subscriber T*ln*–X restores his handset.

If the subscriber *Tln*–X is now called, the register R*eg* applies the address of the subscriber T*ln*–X to the multiple *z*1, *z*0, *e*1, *e*0 leading to the marker M. This multiple passes through the storage lines of the switch-over storage device US*p*. Through a coincidence circuit KO associated with the respective storage line, the relay KX is energized when the call number of the subscriber T*ln*–X is applied. Through the common disconnecting relay T, the marking lines in the switch-over storage US*p* are disconnected and the markings for the connection of subscriber T*ln*–Y advance to the marker M via the contacts of the storage relay YZ1 . . . , YE . . . . The relay KX, which is individually provided for a storage line, takes over discrimination of the markings. The marker M advances in a way known to the art and establishes a connection to the subscriber station T*ln*–Y which was previously identified by the subscriber X.

As indicated through relay LX, the switch-over order can be cancelled individually via the register R*eg*. For example, the subscriber can dial a separate cancelling order and his own call number.

The storage device US*p* further contains the time comparing device. As soon as the clock pulses T arrive from the clock, the control switches UM and US*t* are set correspondingly. The time provided for restoring the switch-over order is stored in the storage ZS*t*1 . . . , Z*m*10 . . . of the switch-over storage US*p*. Contacts of this storage means are located in the responsive circuit of the individually associated relay LX; thus, this relay responds at the coincidence of the time information in the storage line. The control switches UM, US*t* are actuated at the same time and the switch-over order is cancelled.

While the principles of the invention have been described above in connection with specific apparatus and applications, it is to be understood that this description is made only by way of example and not as a limitation on the scope of the invention.

What is claimed is:

1. In a telephone system, a plurality of subscriber stations, call forwarding means for providing one of said subscriber stations with the capacity to extend calls directed to said one station to any other of said subscriber stations, said call forwarding means including switch over storage means operated responsive to dial pulses for storing switch-over control command signals and the call number of the other of said subscriber stations, said switch over storage means further including means operated responsive to further dial pulses for storing coded signals indicating a time of day for cancellation of the switch-over control command signals, switch means for accepting a designation of actual time and for setting the actual time in the switch-over storage means, means for constantly comparing the stored time information with the actual time information, means responsive to a coincidence in said comparison means between said stored time information and said actual time information for automatically cancelling the switch-over command, and means for automatically identifying the call number of the subscriber initiating the switch-over through a subscriber identification device.

2. The system of claim 1 and means for giving an acknowledging signal to the calling subscriber after the storing of all information required for a switch-over including the coded signals indicating the cancellation time, thereby indicating to the calling subscriber that his command has been properly carried out.

3. The system of claim 2 and means whereby the switch-over condition may be prematurally cancelled by the subscriber who initiated the switch-over, said premature cancellation being responsive to the dialling of a cancelling command signal and the call number of the switched over station.

4, The system of claim 3 and means comprising a register for applying the markings which identify the switch-over station through said storage means to a marker, converting means in said storage means for converting the subscriber address of the switched-over subscriber to the subscriber address of the forwarded station, said converting means comprising coincidence gate means operated responsive to the storage of coded signals indicating the subscriber number and the forwarded subscriber number, and means operated responsive to the operation of said coincidence gate means for disconnecting the storage of said subscriber and transferring only the coded signals indicating the subscriber address at the forwarded station.

References Cited

UNITED STATES PATENTS

| | | | |
|---|---|---|---|
| 3,363,063 | 11/1968 | Kandel et al. | |
| 1,760,823 | 5/1930 | Friendly | 179—18 |
| 3,178,516 | 4/1965 | Bonanno | 179—18 |
| 3,310,630 | 3/1967 | Olander | 179—18 |

WILLIAM C. COOPER, Primary Examiner